(12) United States Patent
Offenberg et al.

(10) Patent No.: US 11,374,741 B2
(45) Date of Patent: Jun. 28, 2022

(54) SYSTEMS AND METHODS FOR DATA PROVENANCE ASSURANCE

(71) Applicant: Seagate Technology LLC, Cupertino, CA (US)

(72) Inventors: Manuel Alexander Offenberg, South Lake Tahoe, CA (US); Simon Thavatchai Phatigaraphong, Pomona, CA (US); Kenneth K. Claffey, Danville, CA (US)

(73) Assignee: Seagate Technology LLC, Fremont, CA (US)

(*) Notice: Subject to any disclaimer, the term of this patent is extended or adjusted under 35 U.S.C. 154(b) by 527 days.

(21) Appl. No.: 16/511,832

(22) Filed: Jul. 15, 2019

(65) Prior Publication Data
US 2021/0021410 A1 Jan. 21, 2021

(51) Int. Cl.
| | |
|---|---|
| *H04L 29/06* | (2006.01) |
| *H04L 9/08* | (2006.01) |
| *G06F 16/23* | (2019.01) |
| *H04L 9/30* | (2006.01) |
| *H04L 9/06* | (2006.01) |
| *H04L 9/14* | (2006.01) |

(52) U.S. Cl.
CPC ........ *H04L 9/0825* (2013.01); *G06F 16/2308* (2019.01); *G06F 16/2365* (2019.01); *G06F 16/2379* (2019.01); *H04L 9/0637* (2013.01); *H04L 9/14* (2013.01); *H04L 9/3073* (2013.01); *H04L 2209/38* (2013.01)

(58) Field of Classification Search
CPC ....... H04L 9/0825; H04L 9/0637; H04L 9/14; H04L 9/3073; H04L 2209/38
USPC ......................................................... 380/282
See application file for complete search history.

(56) References Cited

U.S. PATENT DOCUMENTS

| | | | |
|---|---|---|---|
| 2019/0058599 A1* | 2/2019 | Takada Chino | ...... G06F 21/602 |
| 2019/0373472 A1* | 12/2019 | Smith | ................... H04W 12/35 |
| 2020/0366471 A1* | 11/2020 | Jo | ....................... H04L 63/0428 |

* cited by examiner

*Primary Examiner* — Evans Desrosiers
(74) *Attorney, Agent, or Firm* — Mueting Raasch Group

(57) ABSTRACT

A system comprises one or more storage entities (SEs) each configured to store data for applications that rely on higher levels of data integrity, wherein each of the SEs has its own cryptographic identity in the form of a unique root identity key pair of public and private keys created at manufacturing time. Each SE generates one or more SE-specific asymmetric data owner keys upon invocation of a smart contract by a prospective data owner. The system further comprises a distributed ledger provisioned to the SEs and configured to maintain all public keys and/or public key certificates of the SEs. The system also comprises a key manager configured to hold all SE-specific data owner public keys and SE data access control keys, wherein the data stored on the SEs is protected by the SE-specific data access control keys wrapped by the SE-specific data owner keys based on current data ownership.

20 Claims, 2 Drawing Sheets

SYSTEMS AND METHODS FOR DATA PROVENANCE ASSURANCE

SUMMARY

Provided herein is a system that includes one or more storage entities (SEs) each configured to store data for applications that rely on higher levels of data integrity, wherein each of the SEs has its own cryptographic identity in the form of a unique root identity key pair of public and private keys created at manufacturing time. Each SE generates one or more SE-specific asymmetric data owner keys upon invocation of a smart contract by a prospective data owner. The system further comprises a distributed ledger connected to the SEs, containing all provisioned SE's by maintaining all public keys and/or public key certificates of the SEs. The system also comprises a key manager configured to hold all SE-specific data owner public keys and SE data access control keys, wherein the data stored on the SEs is protected by the SE-specific data access control keys wrapped by the SE-specific data owner keys based on current data ownership.

These and other features and advantages will be apparent from a reading of the following detailed description.

DESCRIPTION

Figure 1:
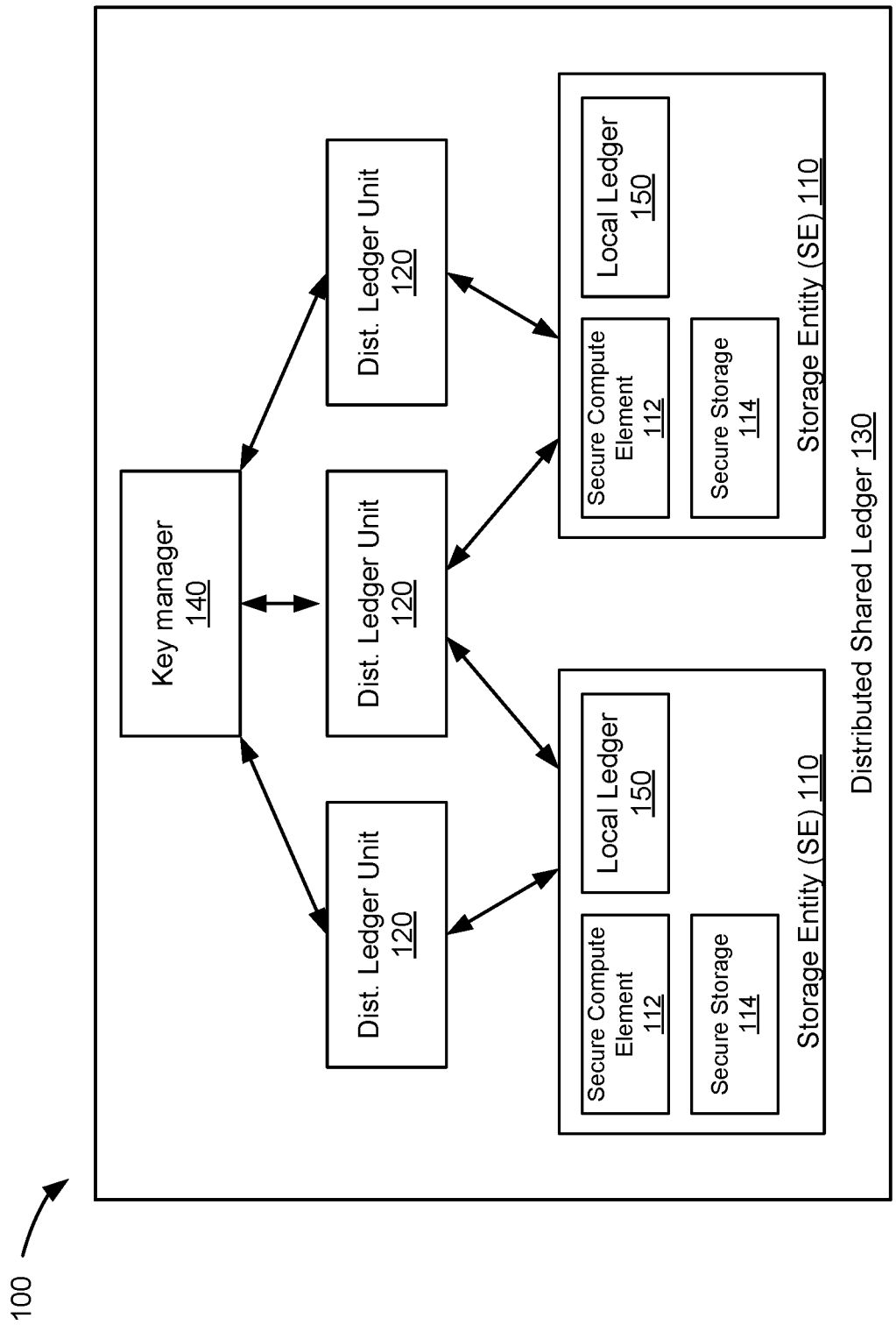
FIG. 1 shows a data storage medium system according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device or a processor. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "decrypting," "encrypting," "processing," "updating," "instantiating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media/drive can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

With the rapid growth of data and the growing reliance on that data for automated decision processes, having a way to track the data's provenance has become increasingly important. For example, autonomous decisions based on machine learning (ML) and artificial intelligence (AI) rely on correct empirical datasets to train models being used. Any unauthorized/malicious changes to the datasets for training may cause improper skewing of the models used for ML and AI by, e.g., classifying malicious malware behavior as proper. In addition, with the emergence of voice authentication technologies and techniques such as Deepfakes, which synthesizes existing images and videos onto source images or videos based on AI to create fake content, integrity of source data becomes critical for users to trust the outcome of the models.

A new approach is proposed that contemplates systems and methods to improve the trust of data moving through any data ecosystem by connecting all storage entities to a ledger. Distributed ledger technologies (DLTs) and blockchain technologies are utilized to establish a higher level of data provenance assurance by keeping immutable records of data creation, data copy, data moves, data purge, data ownership changes/transfers, data processing, and data access. Here, provenance of data includes proving one or more of originality, authenticity, trustworthiness, and integrity of the data. Being able to establish a high level of assurance of provenance of the data by tracing the data from creation and throughout its life cycle increases the trust associated with that data.

Referring now to FIG. 1, a data storage system 100 according to one aspect of the present embodiments is shown. The system 100 includes one or more storage entities (SEs) 110, one or more distributed/ledger nodes 120 running on a set of non-SE compute nodes, e.g., user/application nodes, participating in a public, public-permissioned, or distributed/shared ledger 130, a key manager 140, and one or more local ledgers 150 associated with the one or more SEs 110.

In the example of FIG. 1, each of the SEs 110 can be a single storage drive or a storage system consisting of one or more individual drives each can be but is not limited to a hard drive, a solid state drive, and/or any of the computer storage drive discussed above that are configured to store data for applications that rely on higher levels of data integrity. In some embodiments, each SE 110 has its own cryptographic identity, e.g., a unique root identity key pair of public/private keys created at manufacturing time of the SE 110 and stored in secure storage 114 of the SE 110. For the purpose of the discussions below, that root identity key pair is used to secure multiple other SE-specific/unique crypto identities that represent data owners wherein the public key of the root identity key pair is tied to a data owner identity of the SE 110 via a public key certificate.

In some embodiments, each SE 110 and/or each distributed ledger unit (peer) 120 acts as a node within the public, permissioned-public, or private distributed shared ledger 130, wherein the cryptographic identities of the SEs 110 and operations that rely on the use of those cryptographic identities are secured by an integrated secure computation environment. Optionally, the secure computation environment is split into multiple (virtual) secure compute environments each securely separating identity keys and operations associated with those keys.

In some embodiments, each SE 110 has an immutable random secure root key, e.g., hidden root key (HRK), wherein the HRK is used to secure the SE's root identity key pair or a set of intermediate keys that protect the SE's root identity key pair. In some embodiments, the SE 110 includes a secure compute element 112 that is configured to access the HRK, which can then be used by the SE to unwrap the SE's root identity key pair.

In some embodiments, a set of smart contracts implement logic for various data operations including but not limited to data owner provisioning, data ownership transfer, data move, data copy, and data purge operations. In some embodiments, the smart contracts can be invoked with inputs signed by data owner private key, wherein SE-specific data owner public key can be part of the input.

In some embodiments, each SE 110 is configured to generate one or more SE-specific asymmetric data owner public and private keys upon invocation of a smart contract by one or more prospective data owners. In some embodiments, the smart contract invocation may require multiple intra- and/or inter-organizational entities to endorse/sign the data transaction/operation implemented by the smart contract. In some embodiments, the SE 110 is configured to validate that a) the data owners are provisioned within the distributed shared ledger 130 and b) that owner of the SE-specific data owner keys is the actual owner of the data on the SE 110 at the moment of smart contract invocation. In some embodiments, the SE 110 is configured to return the SE-specific data owner public key protected (e.g., signed/wrapped) by the SE's root private key in the SE's root identity key pair. The data owners then cryptographically verify the SE's root identity, create a SE-specific data owner public key certificate and return the certificate to the SE 110, which stores all SE-specific data owner keys.

In the example of FIG. 1, a key manager 140 is connected to the one or more ledger nodes 120 and holds all SE-specific data owner public keys as well as all SE data access control keys. The data stored on the SEs 110 is protected by one or more of the SE-specific data access control keys, which are wrapped by one or more of the SE-specific data owner keys. Here, the key manager 140 serves as the gatekeeper of credentials within the data storage system 100. In some embodiments, the key manager 140 is a logical component that stores and manages keys based on results/outputs from smart contracts.

In some embodiments, the key manager 140 is configured to utilize the smart contracts to associate/wrap the appropriate data access control keys with the data owner public key(s) based on current data ownership. Note that the data on the SE 110 can be owned by multiple data owners and thus multiple copies of data access control keys, each wrapped by different data owner public keys, may exist in the key manager. The SE-specific data access control key can be either a SE data partition unlock key or a data encryption key. In some embodiments, the smart contracts are also used by data owner to gain access to the data access control keys stored in the key manager 140. Data access control keys are always wrapped with SE-specific data owner key when outside the key manager 140 or SE 110.

In the example of FIG. 1, all of the SEs 110 are provisioned by a data admin entity, e.g., a storage system administrator, wherein the SEs 110 and the distributed ledger nodes 120 are peer nodes in the public, public-permissioned, or private blockchain network. In some embodiments, one of the distributed shared ledger nodes 120 is located at a centralized server or data center and shared among the SEs 110 and the distributed shared ledger 130 configured to contain all public keys and/or public key certificates of the SEs 110. In some embodiments, all prospective data owners are also provisioned with the distributed shared ledger 130 by the data admin entity, wherein the distributed shared ledger 130 is configured to maintain one or more public keys and/or public key certificates of the data owners who own the data stored on the SEs 110. In some embodiments, the distributed shared ledger 130 is configured to maintain and keep track of a plurality of events according to data operations on the SEs 110. In some embodiments, the data operations including but not limited to data ownership transfer, data move, data copy, and data purge operations are logged on the distributed shared ledger 130 by adding records of events to the distributed shared ledger 130. In some embodiments, these records may include additional information, e.g., integrity information of the data. In some embodiments, the SEs 110 are configured to access, interact with and update/report with the distributed shared ledger 130 periodically (in regular time intervals) and/or when an event discussed above happens to the SEs 110. In some embodiments, one of the ledger nodes 120 is configured to provide one or more Application Programming Interfaces (APIs) which the SEs 110 can invoke to access, interact with and log events to the distributed shared ledger 130.

In some embodiments, inter-SE data copy and data move operations between a source SE and a target SE of the SEs 110 are governed by one or more of the smart contacts that run on distributed shared ledger 130 and validate all preconditions of the operations before data is transferred. In some embodiments, each of the operations is recorded in a transaction on the distributed shared ledger 130 under the source SE's data owner key and acknowledged under the target SE's data owner key. In case of data move operation, the source SE 110_1 is configured to purge all data once target SE 110_2 has transacted the data and recorded on the distributed shared ledger 130. In some embodiments, the data purge event is recorded on the distributed shared ledger 130 by the source SE under that SE's unique data owner key. If multiple data owners exist, metadata of the data will determine if one or more data owners need to approve/co-sign when the data is copied or moved. In some embodiments, the co-signing is enforced by the smart contract, which triggers the appropriate key changes at the key manager.

In some embodiments, data ownership changes are also governed by a smart contract, wherein data ownership can change as part of a data move or data copy and the smart contract will trigger the appropriate key changes at the key manager 140. Note that data ownership transfers may include transfers into the public domain under specific licensing models (e.g., Creative Commons). In some embodiments, data ownership transfers may cause the key manager 140 to wrap a data access control key with new owner's SE-specific public key while destroying old owner's wrapped data access control key. For both data copy and data move, the key manager 140 is configured to wrap the target SE's data access control key with that SE's unique data owner public key. In the case of data copy, the original keys stay untouched, while for data move, the original keys are destroyed by the key manager 140. For data purge, the wrapped data access control key is erased by the key manager 140.

In some embodiments, data processing is considered data creation with one addition wherein the original data source is referenced. The data processing is done either under the same ownership as data owner or data ownership is transferred before the data is processed (to match processing ownership to data ownership). The processing end-results are then stored under the SE's unique data owner key that matches processing ownership.

In some embodiments, all data created at an end-point (such as a sensor) are stored under control of the SE-specific data owner key during the creation of such data. If the SE-specific data owner key is present, the SE 110 may track one or more data creation events on the SE 110 in a local ledger unit 150 located internally within the SE 110 using the SE's unique data owner key to sign the record added to the local ledger unit 150. In some embodiments, data owner policy enforcement may alter behavior of the SE 110 under one or more of the following: 1) no data creation is recorded on the distributed shared ledger 130; 2) data creation is recorded on the distributed shared ledger 130 under an anonymous key; 3) data creation is recorded by the SE 110 using the data owner key but stays local to SE 110 on the local ledger unit 150; 4) data creation is recorded by SE 110 under the data owner key and is then added to the shared distributed shared ledger 130. Note that multiple data owners may exist and each data owner is represented by a SE-specific data owner key. Under that scenario, additional record(s) are added to the local ledger 150 referencing the first data creation record.

In some embodiments, each SE 110 is configured to calculate a unique fingerprint of data created on the SE 110 that is both used for data identification and data integrity, e.g., by calculating a message digest value of the data. The SE 110 is then configured to transact on its local ledger 150 using SE-specific data owner key to establish ownership of the data on the SE (potentially based on ownership of processing unit that generated the data). In some embodiments, the data owner may request data creation operations to be added to the distributed shared ledger 130, although this is not required as not all data is valuable enough to be traced. Alternatively, the SE 110 maintains its own local ledger 150 for which only ledger snapshots are added to the distributed shared ledger 130.

In some embodiments, updates to the distributed shared ledger 130 are distributed and copied to all local ledgers 150 of the SEs 110 internally. Each SE 110 will then synchronize its SE state for data stored on the SE 110 based on the information in its local ledger 150. For data purge, the SEs 110 are configured to garbage collect erased data storage locations. For data ownership transfers, the SEs 110 are configured to ensure that appropriate SE-specific data owner keys are created. For any revoked keys, the SEs 110 are configured to change one or more of data ownership, change SE-specific data owner keys, or purge data appropriately. Any SE-specific data ownership keys are revoked in the key manager 140 and the event is added to the distributed shared ledger 130. The SEs 110 will then purge SE-specific data ownership keys accordingly. In some embodiments, the data owner identity keys and the SE root identity keys are revoked by updating the distributed shared ledger 130. These keys are no longer trusted and thus unable to invoke smart contracts or access data. Since the data access control key is wrapped by a SE-specific data owner key and the SE-specific data owner key certificate was signed by the data owner identity key, the SE-specific data owner key is revoked by virtue of revoking the data owner identity key and as such, the SE 110 will prohibit key unwrap operations of the data access control key(s).

In some embodiments, the distributed shared ledger 130 is a blockchain, wherein the addition of a record onto the ledger 130 is governed by a consensus protocol based on, e.g., RAFT, BFT, proof-of-work, or proof-of-stake consensus mechanisms. Here, the blockchain is created and utilized to distribute and keep track the events and/or data being transmitted and/or exchanged between the SEs 110 and ledger nodes 120 via the blockchain in a secure fashion using cryptography. In some embodiments, the blockchain-enabled ledger 130 is configured to share data and information with various other nodes within a network, e.g., one or more other ledger units, storage drives, and processing entities, etc., in a cryptographically secure manner, wherein each of the nodes is allowed to access, and/or decrypt the encrypted data with permission. In some embodiments, new event and/or data may be encrypted and appended to the blockchain while preventing prior data within the blockchain from being modified. The newly added event and/or data may be propagated to the nodes within the network in order to update the blockchain at each node. As such, any data generated or processed, whether public/private, is tracked by the blockchain-enabled ledger 130 and cannot be modified without breaking the blockchain.

Figure 2:
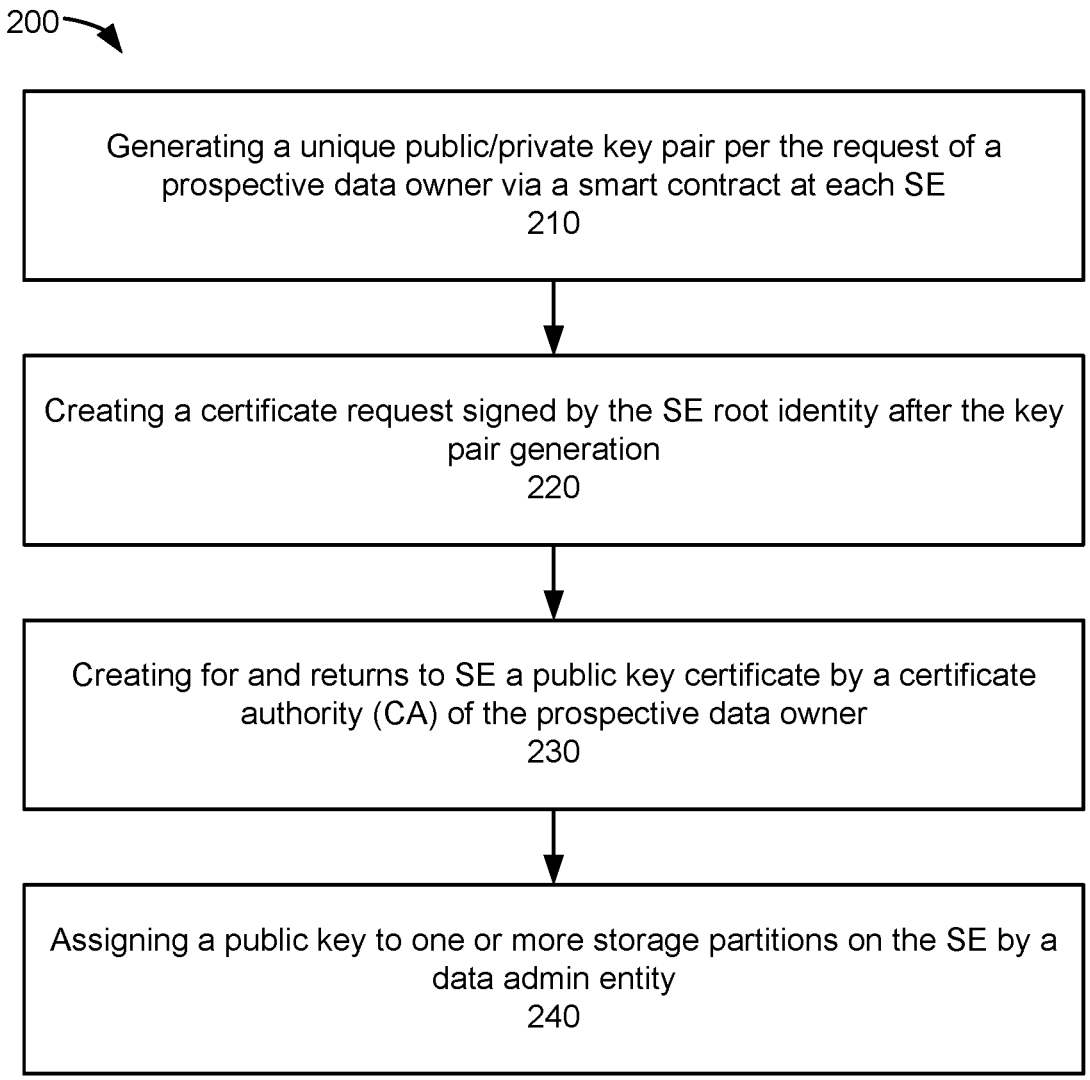
FIG. 2 depicts a flowchart of an example of a process to support data ownership provisioning according to one aspect of the present embodiments.

In some embodiments, the cryptographic identities of the SEs 110 are used to transact on the blockchain for the blockchain-enabled ledger 130 and to assign data ownership via provisioning of such cryptographic identities. FIG. 2 depicts a flowchart of an example of a process to support data ownership provisioning. One skilled in the relevant art will appreciate that the various steps portrayed in this figure could be rearranged, combined and/or adapted in various ways. In the example of FIG. 2, each SE 110 is configured to generate a unique public/private keypair per the request of a prospective data owner (via a smart contract) at step 210. After key pair generation, the SE 110 is configured to create a certificate request signed by the SE root identity at step 220. A certificate authority (CA) of the prospective data owner then creates for and returns to SE 100 a public key certificate at step 230. A data admin entity then assigns a public key to one or more storage partitions on the SE 110 at step 240. The data ownership provisioning process of steps 210-240 above can be repeated for each prospective data owner.

The following is a non-limiting example of a use case of the data storage system 100 in the context of farming application where a drone is rented by a farmer to be used for field surveillance, wherein temporary ownership of the drone is transferred to farmer. The storage device on the drone is provisioned for use by the farmer and all data stored on the storage device is now owned by farmer. In some embodiments, the data can be moved from the drone onto a local storage device (e.g., an edge box) without data ownership changes when the field surveillance is complete. As part of the data move, all data on the drone is destroyed. The edge box is provisioned for ownership by the farmer and thus any data processing output is now automatically owned by the farmer. In some embodiments, the result set of the data is copied from the local edge box to the cloud and data ownership of that copy is transferred to an insurance company for, e.g., claim adjudication. The insurance company then creates a copy of data, sends it to a claims adjuster, and transfers ownership of that data accordingly while maintaining its copy. The claims adjuster can validate data provenance and ownership history of the data by checking information on the shared ledger.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A system comprising:
    one or more storage entities (SEs) each comprising one or more storage drives configured to store data for an application that relies on higher levels of data integrity, wherein each SE of the one or more SEs has its own cryptographic identity in the form of a unique root identity key pair of public and private keys created at manufacturing time of the SE, wherein the public key of the root identity key pair is tied to an identity of the SE via a public key certificate, wherein each of the one or more SEs is configured to generate one or more SE-specific asymmetric data owner public and private keys upon invocation of one of a set of smart contracts by one or more prospective data owners;
    one or more distributed ledger units connected to a distributed shared ledger, wherein the one or more SEs directly connected or connected via the distributed ledger units to the shared distributed ledger;
    said distributed shared ledger configured to contain all public keys and/or public key certificates of the one or more provisioned SEs and data owners; and
    a key manager connected to said distributed shared ledger and configured to hold all SE-specific data owner public keys as well as all SE data access control keys, wherein the data stored on the SEs is protected by one or more of the SE-specific data access control keys wrapped by one or more of the SE-specific data owner keys based on current data ownership.

2. The system as described in claim 1, wherein:
    the one or more SEs and the distributed ledger units are nodes within a public, public-permissioned or private blockchain network, wherein the cryptographic identities of the SEs and the operations that rely on the use of those cryptographic identities are secured by an integrated secure computation environment.

3. The system as described in claim 1, wherein:
    each of the one or more SEs has an immutable random secure root key used to secure the SE's root identity key pair or a set of intermediate keys that protect the SE's root identity key pair by wrapping and unwrapping the SE's root identity key pair.

4. The system as described in claim 3, wherein:
    each of the one or more SEs includes a secure compute element configured to access the immutable random secure root key used by the SE to unwrap the SE's root identity key pair.

5. The system as described in claim 1, wherein:
    the set of smart contracts implement logic for one or more of data owner provisioning, data ownership transfer, data move, data copy, and data purge operations on the data of the one or more SEs.

6. The system as described in claim 1, wherein:
the smart contract invocation requires multiple cryptographic identities of intra- and/or inter-organizational entities to cryptographically sign one or more of the operations implemented by the smart contract.

7. The system as described in claim 1, wherein:
the SE is configured to validate with the distributed shared ledger that the data owners are provisioned within the network, valid and owner of the SE-specific data owner keys is the actual owner of the data on the SE at the moment of smart contract invocation.

8. The system as described in claim 1, wherein:
the SE is configured to return the SE-specific data owner public key protected by the SE's root private key in the SE's root identity key pair, wherein the data owners sign a SE-specific data owner public key certificate and return the certificate to the SE, which stores all SE-specific data owner keys.

9. The system as described in claim 1, wherein:
the distributed shared ledger is configured to maintain and keep track of a plurality of events according to the data operations on the one or more SEs.

10. The system as described in claim 1, wherein:
inter-SE data copy and data move operations between a source SE and a target SE of the one or more SEs are governed by one or more of the smart contracts that validate all pre-conditions of the operations before data is transferred, wherein each of the operations is recorded in a transaction on the distributed ledger under the source SE's data owner key and acknowledged under the target SE's data owner key.

11. The system as described in claim 1, further comprising:
a local ledger located internally within one of the one or more SEs and configured to track one or more data creation events on the SE using the SE-specific data owner key to sign the record added to the distributed shared ledger.

12. The system as described in claim 10, wherein:
the SE is configured to
calculate a unique fingerprint of data created on the SE that is both used for data identification and data integrity;
transact on the local ledger using SE-specific data owner key to establish ownership of the data on the SE.

13. The system as described in claim 10, wherein:
updates to the distributed shared ledger are distributed and copied to all local ledgers of the SEs, wherein each of the SEs is then configured to synchronize its SE state for data stored on the SE based on the information in its local ledger.

14. The system as described in claim 12, wherein:
the updates to the distributed shared ledger cause the data owner identity keys and the SE root identity keys to be revoked, wherein these keys are no longer trusted and thus unable to invoke smart contracts or access data.

15. A system comprising:
one or more storage entities (SEs) each comprising one or more storage drives configured to store data for an application that relies on higher levels of data integrity, wherein each SE of the one or more SEs has its own cryptographic identity in the form of a unique root identity key pair of public and private keys created at manufacturing time of the SE, wherein the public key of the root identity key pair is tied to an identity of the SE via a public key certificate, wherein each of the one or more SEs is configured to generate one or more SE-specific asymmetric data owner public and private keys upon invocation of one of a set of smart contracts by one or more prospective data owners; one or more blockchain-enabled ledger units connected to a blockchain, wherein the one or more SEs directly connected or connected via the blockchain-enabled ledger units;
said blockchain configured to contain all public keys and/or public key certificates of the one or more provisioned SEs and data owners;
wherein the blockchain is governed by a consensus protocol and utilized to distribute and keep track of events and/or data being transmitted and/or exchanged between the one or more SEs and one or more ledger units via the blockchain in a secure fashion using cryptography; and
a key manager connected to said blockchain and configured to hold all SE-specific data owner public keys as well as all SE data access control keys, wherein the data stored on the SEs is protected by one or more of the SE-specific data access control keys wrapped by one or more of the SE-specific data owner keys based on current data ownership.

16. The system as described in claim 15, wherein:
one of the blockchain-enabled ledger unit is configured to share data and information with various nodes within a network in a cryptographically secure manner, wherein each of the nodes is allowed to access, and/or decrypt the encrypted data with permission.

17. The system as described in claim 15, wherein:
the cryptographic identities of the one or more SEs are used to transact on the blockchain using the blockchain-enabled ledger unit and to assign data ownership via provisioning of such cryptographic identities.

18. A method comprising:
storing data for an application that relies on higher levels of data integrity one or more storage entities (SEs) each comprising one or more storage drives, wherein each SE of the one or more SEs has its own cryptographic identity in the form of a unique root identity key pair of public and private keys created at manufacturing time of the SE;
tying the public key of the root identity key pair to an identity of the SE via a public key certificate;
generating one or more SE-specific asymmetric data owner public and private keys upon invocation of one of a set of smart contracts by one or more prospective data owners;
maintaining all public keys and/or public key certificates of the one or more SEs on a ledger unit provisioned by a data admin entity, wherein the ledger unit is located at a centralized server and is shared among the one or more SEs; and
holding all SE-specific data owner public keys as well as all SE data access control keys in a key manager connected to said ledger unit;
protecting the data stored on the SEs by one or more of the SE-specific data access control keys wrapped by one or more of the SE-specific data owner keys based on current data ownership.

19. The method as described in claim 18 further comprising:
tracking one or more data creation events on one of the one or more SEs by using the SE-specific data owner key to sign the record added to a local ledger located internally within the SE.

20. The method as described in claim 18 further comprising:

utilizing a blockchain as governed by a consensus protocol wherein the blockchain is utilized to distribute and keep track the events and/or data being transmitted and/or exchanged between the one or more SEs and the ledger unit via the blockchain in a secure fashion using cryptography.

* * * * *